W. COUPE.
Machinery for Raising and Transferring Hides from Vats.
No. 165,212.  Patented July 6, 1875.
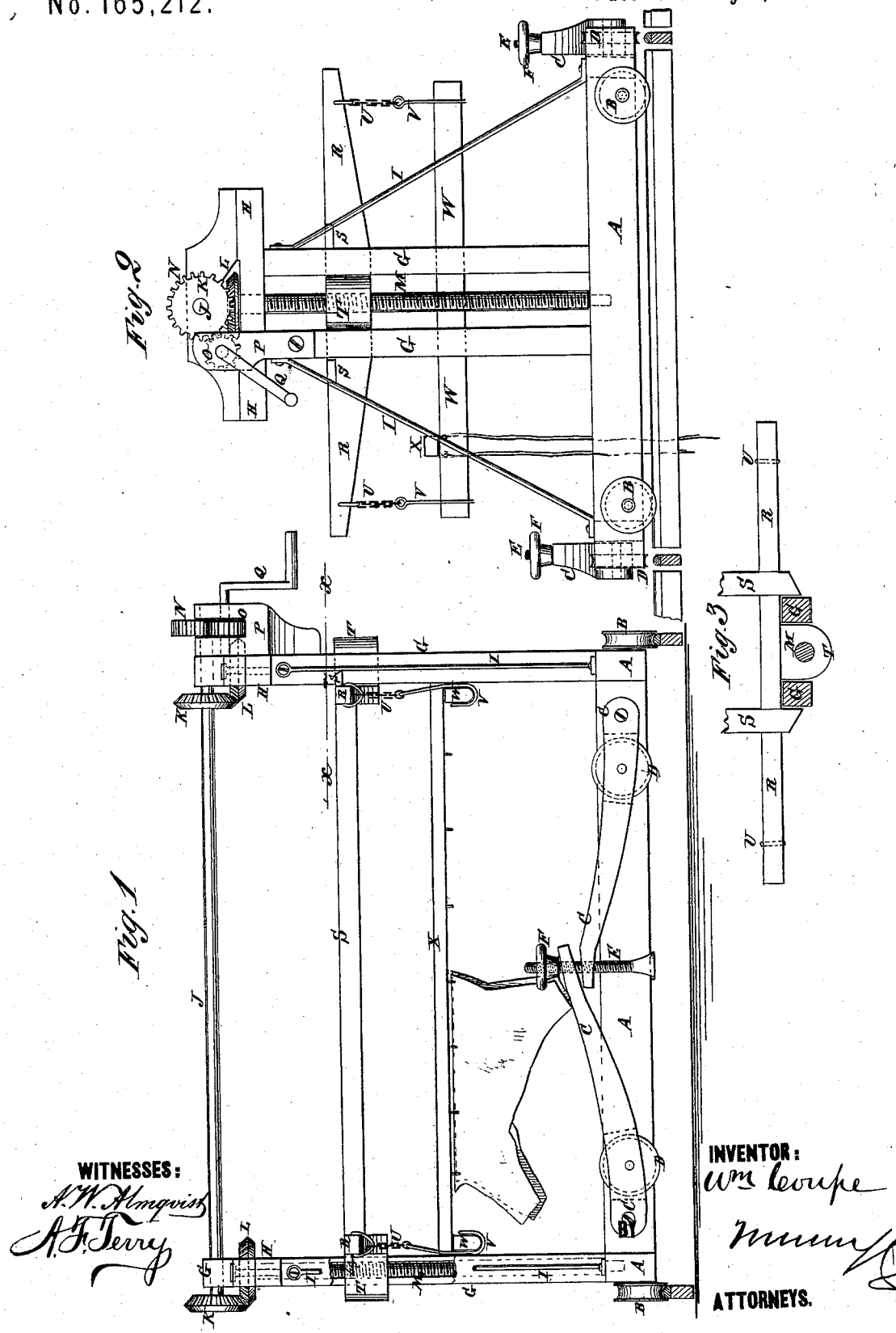

UNITED STATES PATENT OFFICE.

WILLIAM COUPE, OF SOUTH ATTLEBOROUGH, MASSACHUSETTS.

IMPROVEMENT IN MACHINERY FOR RAISING AND TRANSFERRING HIDES FROM VATS.

Specification forming part of Letters Patent No. 165,212, dated July 6, 1875; application filed June 5, 1875.

*To all whom it may concern:*

Be it known that I, WILLIAM COUPE, of South Attleborough, in the county of Bristol and State of Massachusetts, have invented a new and useful Improvement in Machine for Raising, Lowering, and Transferring Hides, &c., of which the following is a specification:

Figure 1 is a side view of my improved machine. Fig. 2 is an end view of the same. Fig. 3 is a detail section taken through the line *x x*, Fig. 1.

Similar letters of reference indicate corresponding parts.

The object of this invention is to furnish an improved machine for raising, lowering, and transferring hides in a tannery, for handling goods in dye-houses, and for other similar uses, which shall be simple in construction and convenient in use, and shall effect a great saving in time and labor. The invention consists in the frame-work provided with the wheels, and the levers, wheels, screw-rods, and hand-nuts, to adapt it to receive and transport the operating mechanism of the machine; in the combination of the gearing and the swiveled screws with the frame-work of the machine, for raising and lowering the hides; and in the combination of the cross-heads and their connecting bars and nuts, and the chains and hooks, with the swiveled screws, for connecting the hides with the operating gearing, as hereinafter fully described.

I will describe the machine as used in a tannery.

A is the base-frame of the machine, which is made rectangular in form, and of any convenient length and breadth. To the end bars of the frame A are pivoted wheels B, which are designed to run upon a track attached to the edges of the vats, so that the machine can be conveniently run from one vat to another in the same tier, and to the place where the green packs are kept. To the side bars of the frame A, near their ends, are pivoted the ends of levers C, to which, at a little distance from their ends, are pivoted wheels D, which, when lowered a little below the level of the wheels B, are designed to run upon a temporary track, so that the machine may be run from one tier of vats to another, or to any desired place.

The inner ends of the two levers C upon each side of the frame A overlap each other, and are slotted longitudinally to receive the upright rod E, the lower end of which is bent inward, and is secured to the lower side of the side bar of the frame A. The rods E have screw-threads cut upon them to receive the hand-nuts F, so that by screwing down the said hand-nuts the wheels D may be lowered to rest upon the temporary track, and to raise the machine to free the wheels B from the stationary track. To the middle parts of each of the end bars of the frame A, upon the opposite sides of and equally distant from its center, are attached the lower ends of two upright bars, G, the upper ends of which are connected by a cross-bar, H. The upright frames G H are strengthened by braces I. In bearings attached to the cross-bars H revolve the journals of a shaft, J, to which are attached two bevel-gear or worm wheels, K. The wheels, mesh into two bevel-gear wheels or worms, L, attached to the upper ends of two screws, M, which are swiveled to the cross-bars H, and the lower ends of which work in sockets in the end bars of the frame A. To one end of the shaft J is attached a gear-wheel, N, the teeth of which mesh into the teeth of a gear-wheel, O, the journals of which revolve in bearings in a bracket, P, attached to a post, G, and cross-bar H. To the outer journals of the gear-wheel O is attached the crank Q, by which the gearing is operated to turn the screws M. R are two cross-heads, which are placed upon the inner sides of the posts or uprights G, and which are connected by two connecting-bars, S. Upon the outer sides of the centers of the two cross-heads R are formed, or to them are attached, two nuts, T, into the threads of which fit the threads of the screws M, so that the cross-heads R may be raised and lowered by turning the said screws M. To each of the cross-heads R are attached two or more short chains, U, having hooks V attached to their lower ends. The chains U and hooks V should be made of galvanized iron, so that they may not effect, or be effected by, the tanning-liquors into which they are occasionally lowered. The hooks V are designed to receive the hard-wood cross-bars W, upon which rest the ends of the bars X, to which the hides are attached by hooks in the ordinary way.

In using the machine, the green hides are hooked upon the bars X, and the bars X are arranged upon the bars W. The machine is then run to the vat in which the pack is to be placed, and the gearing is operated to turn the screws M and lower the cross-heads R. As the bars W enter the tanning-liquor the hooks V are detached, leaving the bars W X and the hides in the liquor. In case the bars W become so soaked and heavy that they would sink they may have short lanyards attached to their ends, and secured to the edges of the vat.

To transfer hides from one vat to another, the cross-heads R are lowered, the hooks V are hooked upon the ends of the bars W, and the cross-heads R are again raised, bringing with them the bars W X and the hides. The machine is then moved upon the stationary or temporary track to the other vat, and the bars and hides are lowered into it in the manner hereinbefore described.

Having thus described my invention, I claim as new and desire to secure by Letters Patent—

1. The combination, with the frame A G H, provided with wheels B, and bars for suspending the hides, of the pivoted levers C, carrying-wheels D, the screw-rod E, and nut F, as shown and described.

2. The combination of the gearing J K L, N O Q, and the swiveled screws M with the frame-work A G H, for raising and lowering the hides, substantially as herein shown and described.

3. The combination of the cross-heads R, connecting-bars S, nuts T, and the chains and hooks U V with the swiveled screws M, for connecting the hides with the operating gearing, substantially as herein shown and described.

WILLIAM COUPE.

Witnesses:
   JAMES T. GRAHAM,
   T. B. MOSHER.